United States Patent
Pryne

Patent Number: 5,414,915
Date of Patent: May 16, 1995

[54] NEEDLED FELT FILTER BAGS AND METHOD FOR FORMING SAME

[75] Inventor: Wilson H. Pryne, Cornwall on Hudson, N.Y.

[73] Assignee: American Felt & Filter Company, Newburgh, N.Y.

[21] Appl. No.: 81,787

[22] Filed: Jun. 23, 1993

[51] Int. Cl.$^6$ .................. B32B 1/04; D04H 1/46; B01D 46/02; B65D 30/10

[52] U.S. Cl. ........................ 28/107; 28/109; 383/102; 383/107; 55/381; 493/224

[58] Field of Search .............. 383/102, 107; 55/381; 112/10, 262.2, 440, 441, 107; 28/109, 110, 111, 112; 53/455, 456; 493/224, 267, 916, 937

[56] References Cited

U.S. PATENT DOCUMENTS

| | | | |
|---|---|---|---|
| 3,431,611 | 3/1969 | Rentz | 28/112 |
| 3,537,241 | 11/1970 | Wiegel et al. | 55/381 X |
| 3,843,485 | 10/1974 | Doll et al. | 383/107 X |
| 3,955,515 | 5/1976 | Elsas | 112/262.2 X |
| 4,197,343 | 4/1980 | Forsythe | 28/109 X |
| 4,410,441 | 10/1983 | Davies et al. | 383/102 X |
| 4,955,116 | 9/1990 | Hayamizu et al. | 28/110 |

FOREIGN PATENT DOCUMENTS

| | | | |
|---|---|---|---|
| 2659295 | 9/1991 | France | 383/102 |
| 295684 | 11/1991 | Germany | 28/111 |

*Primary Examiner*—John J. Calvert
*Attorney, Agent, or Firm*—Martin Smolowitz

[57] ABSTRACT

Multiple filter bags are formed from a layered composite sheet of two, essentially identical fibrous or felt layers by needling a plurality of transverse paths each 0.75 to 1.5 inches wide on the composite sheet, the paths being spaced 4-18 inches apart so as to form a plurality of tubular shaped channels. The needled transverse paths are then slit longitudinally along a central line so as to form separate elongated tubes, which are then cross cut apart transversely to produce segments of any desired length such as 12-36 inches. These segments are each final closed at one end of each segment by needling or stitching to form multiple filter bag structures. The invention also includes the felt filter bags produced by this method of manufacture.

26 Claims, 3 Drawing Sheets

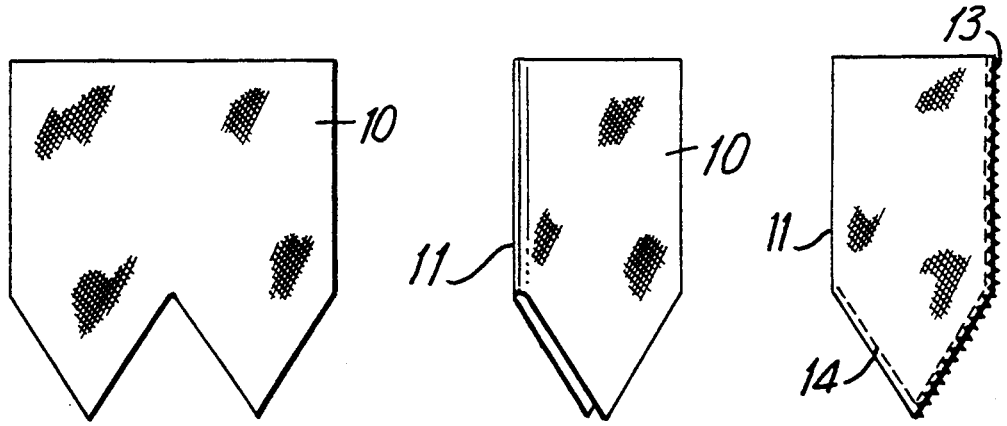
FIG. 1A
PRIOR ART
FIG. 1B
PRIOR ART
FIG. 1C
PRIOR ART
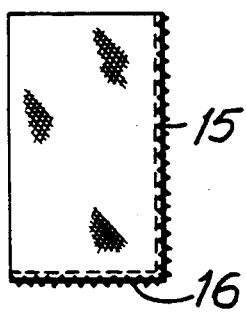
FIG. 2A
PRIOR ART
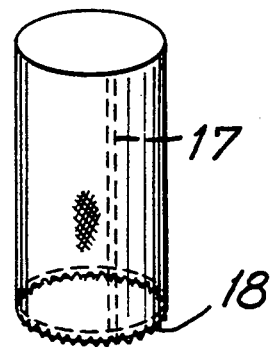
FIG. 2B
PRIOR ART
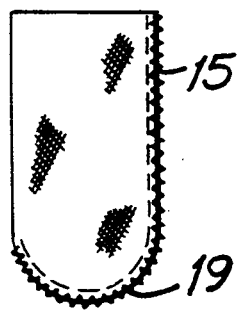
FIG. 2C
PRIOR ART
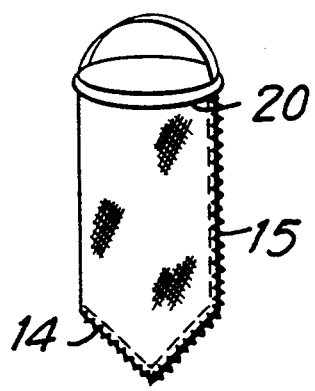
FIG. 2D
PRIOR ART

NEEDLED FELT FILTER BAGS AND METHOD FOR FORMING SAME

BACKGROUND OF INVENTION

The invention relates to a method for forming filter bags by joining together two layers of superimposed fibrous felt sheets by needling at selective areas, and also relates to felt filter bags formed by the needling method.

Forming filter bags from flat felt filter media has been conventionally done by cutting and folding, then machine stitching the edge seams together. One process comprises the steps of cutting out bag blanks by using templates, folding and sewing together the side seam, then sewing the bottom end closed and adding any finishing steps as desired. However, such felt filter bag production methods are relatively expensive, as stitching the side seam together can amount to between 25 and 75% of the total labor component in felt filter bag manufacture, depending on the size and shape of the bag. Also, undesired leakage of fluids can occur through the stitched seams of the filter bag.

A process which is used in the fabric product manufacturing industry for joining together fabric sheets is called mechanical interlocking, needle punching or needling, and consists basically of tucking a small bundle of individual fibers down through a carded batt of fibers in such large numbers of penetrations that a cohesive textile structure is formed. For example, U.S. Pat. No. 3,431,611 to Rentz has disclosed use of needling to produce a plurality of tubular channels on a layered substrate to form nonwoven shells for electric blankets. A pattern of longitudinal parallel lines is needled utilizing an appropriately patterned board, the resulting needled shells are then cut transversely into large articles, and the plurality of channels thus formed between the needles lines in each article receive the electrical cords of the blanket. Also, U.S. Pat. No. 4,955,116 to Hayamizu et al has disclosed a method for producing a tubular felt body which is needle punched along overlapping edges, in which at least a long sheet of felt material is overlapped by dislocating the sheets in width direction to form thin layer portions at both side edges of the overlapped sheets, and the overlapped thin layer portions are then needles together to form one tubular body. However, adapting such a method to the manufacture of felt filter bags would be complicated and uneconomic.

The method for forming filter bags from a fibrous or felt media material according to the present invention eliminates the folding step and the side seam stitching procedure of the prior art constructions, by utilizing a spatially oriented needling procedure for making seams which is similar to that used for making filter media sheets to replace the conventional stitching step for the seams. The present invention represents an important technical advance over the known prior art conditions, and will be clearly defined hereinafter.

SUMMARY OF INVENTION

One object of the present invention is to provide an improved method for reliably producing fibrous or felt filter bags which have improved filtering effectiveness and strength.

Another object is to reduce the unit cost of filter bags by employing a more efficient cutting method which reduces the loss of material due to any defects in the flat filtering media from which the bags are formed, and by reducing the sewing labor and the amount of sewing threads required in the manufacture of the filter bags. A further object is to provide an improved elongated filter bag which has needled seams along opposite sides and the lower end of the bag.

These objects are achieved according to the method of the present invention, whereby an elongated composite formed by two layers of a fibrous filtering media such as needled felt material is joined together by multiple needled transverse paths, the adjacent paths being spaced apart so as to provide a plurality of transverse tubular portions in the composite. These tubular portions are then separated by cutting them along the control portion of each needled path so as to thereby form individual tubes each having two needled side seams, rather than one stitched side seam. The tubes are then cross cut and divided into segments and then finished by either further needling or stitching across one end as desired to form multiple filter bags of suitable length.

Accordingly, the method for forming multiple fibrous felt filter bags according to the present invention comprises the steps of:
  (a) superimposing two elongated layers of a flat fibrous filtering media each having substantially identical weight and composition so as to form a layered composite sheet;
  (b) joining the two flat media layers of the layered composite sheet together by needling a series of transverse needled paths, so as to form multiple transverse tubular channels which are spaced apart from each other along the length of the elongated layered media composite sheet;
  (c) slitting each needled transverse path along the central portion of the needled path and thereby forming separate tubes of the fibrous filtering media each having two needled side seams;
  (d) segmenting the tubes of fibrous media to any desired length, so as to provide multiple tubular segments; and
  (e) closing one end of each the tubular segments so as to form multiple filter bag structures.

To provide a suitable needled path or seam for the filter bags, the transverse needling paths should be made at least about 0.75 inch wide, and need not exceed 1.5 inch wide, and have a needling density of 50–200 punctures/square inch. The needled paths can be spaced apart by 4–18 inches depending upon the filter bag width or diameter desired. If the bag lower end is closed by needling, the needled path or seam should be 0.40–0.75 inches wide for adequate joining strength. Other conventional filter bag finishing steps may be added as desired, such as adding a collar and bail to the bag open end.

There are numerous functional and economic advantages provided by this method for forming multiple needled fibrous felt filter bags, and for the needled filter bags produced according to the invention. The needled seam filter bags are stronger and unit cost per filter bag is lowered, because the amount of sewing labor and thread are reduced by at least half because the seams are formed by needling rather than by sewing or stitching. Also, the cutting time is reduced by making simple multiple straight line cuts along the needled paths, rather than by using a template to cut out the individual bag blanks. Moreover, any defective filtering media material does not result in the loss of an entire bag, because the defect can be removed from the preformed tube and a correct bag made from the immediately following good filter media material.

These advantages may be achieved without requiring new needling equipment, excepting only suitable adaptation of the needle-holding boards to produce the desired pattern of transverse needle paths. Moreover, the method is applicable to sheets of any fibrous material or blend of fibers and/or deniers currently used in the production of felt filter bags.

BRIEF DESCRIPTION OF DRAWINGS

This invention will now be further described with the aid of the following drawings, in which:

FIGS. 1A through 1C illustrate the method of the prior art for forming filter bags by media cutting and seam stitching along the side and one end;

FIGS. 2A through 2D illustrate various shapes of conventional stitched filter bags used commercially;

DETAILED DESCRIPTION OF INVENTION

Figure 3A:
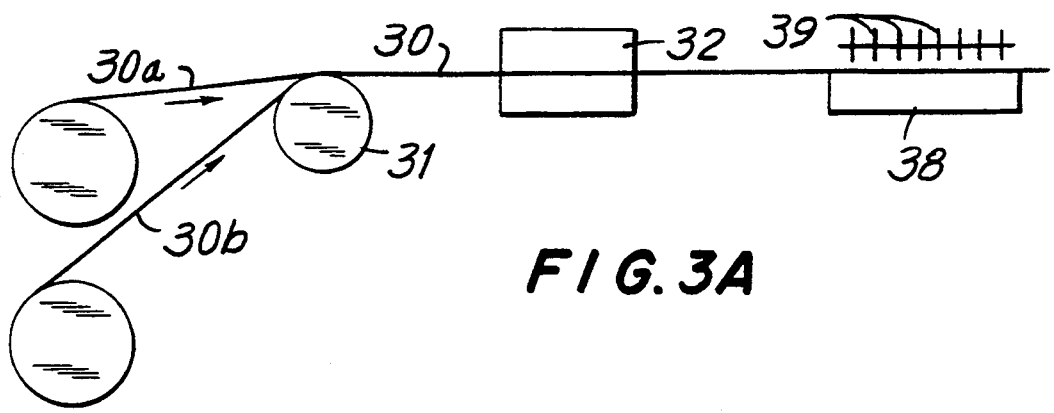
FIG. 3A–3C illustrate schematically the method for producing needled fibrous felt filter bags, including a typical pattern of transverse and cross needled paths produced according to the method of the invention.

FIG. 1A–1C generally illustrate the usual prior art method for making filter bags by cutting, folding and machine stitching together the edges of a sheet of filtering material. FIG. 1A shows a bag blank 10 which has been cut out from flat filter media material such as felt using a template. FIG. 1B shows the blank 10 after being folded in half along the fold line 11. FIG. 1C shows the folded blank for which the side edges have been stitched together to form a seam 13, and the lower conical bottom 14 has been stitched together to form the completed filter bag.

Various other shapes of filter bags can be produced by cutting and folding the filter media material and stitching it together along the seams. FIG. 2A shows a rectangular shaped bag having a stitched side seam 15 and a straight bottom seam 16; FIG. 2B shows a sewn bag having a side seam 17 and a generally circular bottom seam 18, and FIG. 2C shows a sewn bag having a side seam 15 and a curved bottom seam 19, and FIG. 2D shows a sewn bag unit having a side seam 15, a conical bottom seam 14, a metal or plastic ring sewn into a collar 20 and a lifting handle 21.

Figure 3B:
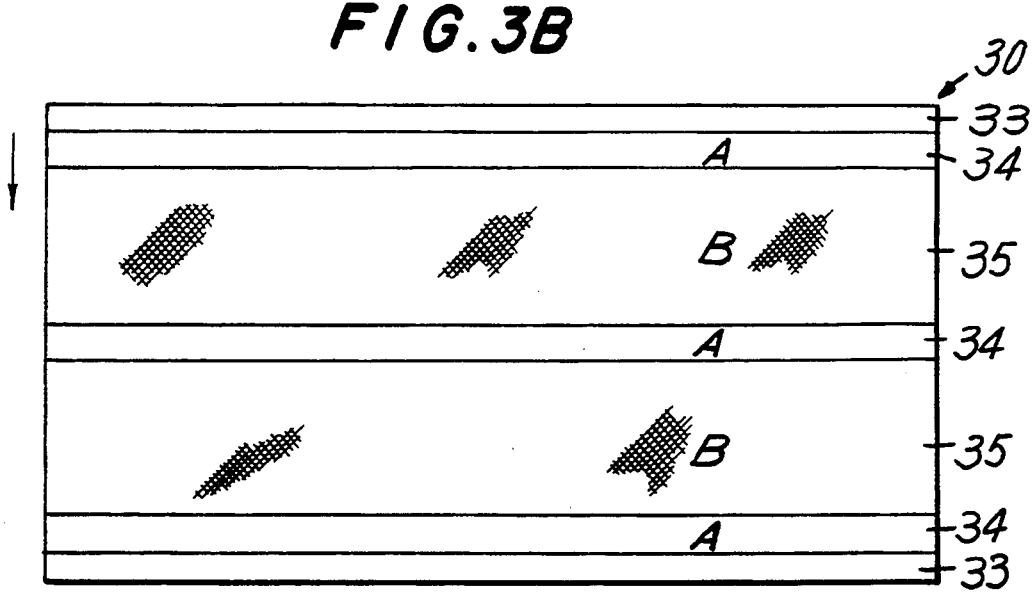

The method for forming multiple needled fibrous filter bags according to this invention will now be described. Two layers or sheets of a suitable fibrous filter media material such as felt, each having substantially identical composition and thickness, are first superimposed on each other to form a layered composite. Then a plurality of transverse needled paths or seams are formed in the superimposed layers, by utilizing a needle punching or needling procedure. As shown schematically by FIG. 3A, such needling procedure can be achieved by passing an elongated layered composite sheet 30 formed by two superimposed layers 30a and 30b of a filtering media material over a roller 31 and then across a special needling board 32. The needle board is adapted for producing a selective needling pattern utilizing needle punchings having a density of 50–200 punchings/in$^2$ in the filter media composite sheet 30. One useful needled pattern is shown by FIG. 3B, in which a pattern of transverse parallel needling areas or paths A have been formed separated by sheet portions B. After allowing for an unused end portion 33, the multiple needled paths 34 are formed transversely across the elongated composite sheet 30, leaving a plurality of intervening portions 35 therebetween. As shown by FIG. 3A, these intervening portions 35 are later cut apart along and within needled path 34 at cutting step 38 by suitable cutters such as rotary cutter blade(s) 39 to form a plurality of elongated tubes, as described hereinafter. The needled paths A are each made 0.75–1.5 wide, and are spaced apart by varying distance B equal to the desired width of a filter bag element, such as 4–18 inches wide.

Figure 3C:
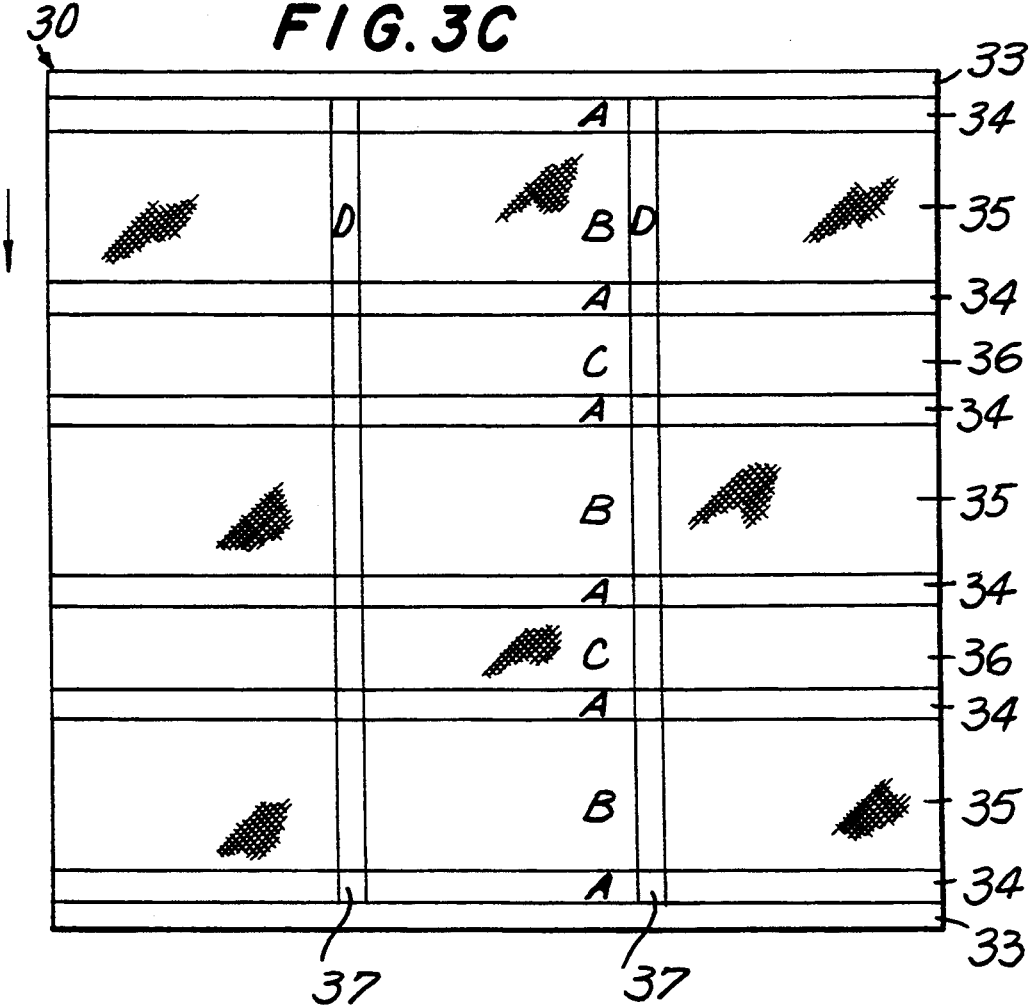

As an alternative needling procedure as shown in FIG. 3C, intervening spaces having two different width B and C can be provided between alternate needled paths A. For this alternative needling pattern, after allowing for the unused end portion 33, multiple transverse needled paths 34 are formed across the elongated composite sheet 30, leaving intervening portions 35 and 36 therebetween which form tubular portions each having a different width. Typically the width of the needling paths A is between 0.75 and 1.5 inches, the width of the intervening spaces B which provide tubular channels is between 6 and 18 inches, and the width of the intervening spaces C is 4–12 inches. Although for the FIG. 3B and 3C constructions the needled transverse paths A are all substantially parallel with each other, these needled path A can be made non-parallel, so that the intervening portions 35 and 36 are tapered relative to each other at an included angle of 5°–15°.

As another alternative needling procedure for the composite sheet 30 as shown by FIG. 3C, two or more cross needled paths D can be provided in the composite sheet 30 as it is moved across or through the special needling board 32. These additional cross needled paths 37 are each made 0.40–0.75 inches wide and serve to provide a bottom seam for each filter bag after a segment cutting step as described further below.

Figure 4A:
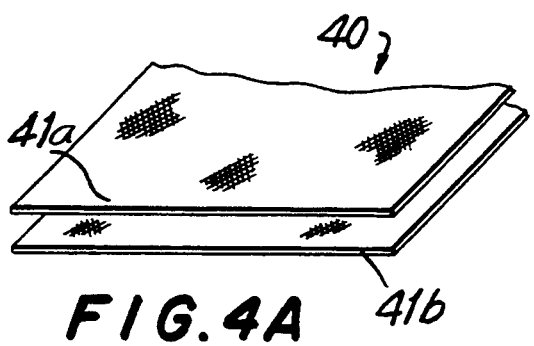
FIGS. 4A through 4D illustrate in perspective views a layered filtering media composite and the essential needling, slitting and segmenting steps needed to produce multiple filter bags formed according to the invention.
Figure 4C:
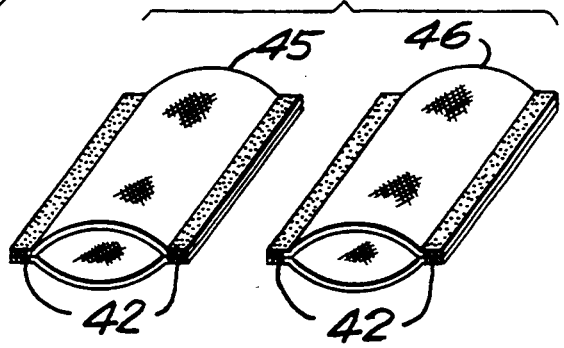
Figure 4B:
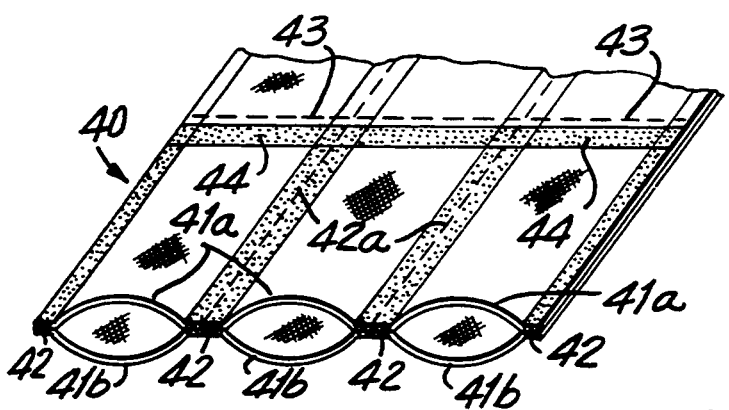

FIG. 4A shows schematically a perspective end view of two filter media layers 41a and 41b which are superimposed so as to form a composite media sheet 40 illustrating the first step according to the method of the invention. FIG. 4B shows a perspective end view of the composite sheet 40 after strip needling along multiple spaced apart paths 42 to form tubular portions. FIG. 4C shows two of the separated tubular portions 45 and 46 which have been formed by cutting along a central line 42a of the needled paths 42. These tubular portions 45 and 46 have also been cross severed along line 43 so as to provide the segmented tubular portions of any desired length. If composite sheet 40 also has cross needled paths 44, the severance line 43 is located adjacent to the needled path 44 so as to provide one open end and one closed end for each tubular segment 45 and 46, which may each have length of 12–36 inches.

Figure 4D:
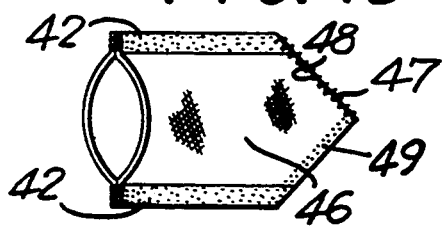

FIG. 4D shows a perspective view of a segmented portion 46 of the needled tubular structure of FIG. 4C, which has been cut at one end so as to have a conical shaped end portion 47. The media layers of end 47, which can be straight or conical, can be sewn together at seam 48 in the conventional manner to form a filter bag 50. Alternatively, the end of the bag can be joined together by needling at seam 49. The bag may be further finished, e.g. to provide a lifting handle and metal or plastic ring sewn into a collar, as is generally shown in FIG. 2D, to provide a filter bag 50 in which both side end seams are formed by the needling method of this invention.

The method according to the invention is applicable to layers of any fiber or blend of fibers and/or deniers currently used in the production of filter bags, including but not limited to acrylics, aramids, nylon, and olefinic polyester and Viscose rayon fibers. For filter media material used for forming filter bags, the fiber denier or size and the medial thickness used will depend on the desired particle micron size rating of the filter media. For example, filter bags having low micron particle size rating such as capable of removing particles larger than 1-10 microns would use a mixture of 1.5 and 3 denier plastic fibers and have media thickness of 0.055-0.090 inch. Filter media rated 15-50 microns would utilize a mixture of 5.0-15.0 denier fibers and have thickness of 0.060-0.125 inch, and filter media rated 75-200 microns would utilize a mixture of 15-35 denier fibers and have media thickness of 0.70-0.250 inch.

For filter bags formed according to this invention, the needled paths or seams 42 and 44 serve mainly as an effective media layer attachment means, so that very little fluid flow occurs outwardly through the needled seams and they have very little filtering function. However, it is emphasized that attaching the edges of a filter bag together by needling according to this invention instead of by conventional stitching is very advantageous, because it eliminates any holes formed by the stitching needle and thread. Such stitching holes are usually up to 50% larger than any needling punctures or openings, so that a filter bag having needled seams can have a precise micron particle size removal rating. Conventional filter bags having stitched side and end seams usually have particle size removal rating only 75-97% that of the filter media itself. Furthermore, the filter bag having needled seams will be stronger and can withstand greater pressure differential than a bag having stitched seams, because the needled seams will have substantially the same strength as the media material itself.

Approximately 75% of the total annual felt filter bag production consists of bags identified in the industry as sizes No. 1 and 2, each being approximately 11.5 inch flat width and either 18 inches long for No. 1 size or 31 inches long for No. 2 size bag. When the process according to this invention is run at a normal 3 linear yards/minute rate, using a layered felt material 72 inches wide, side seam labor is reduced to about three seconds for a No. 1 bag and six seconds for a No. 2 bag. This contrasts to the sewing labor for filter bags of the prior art design, which can be from 30 seconds to one minute per bag depending on its size.

The invention will be further described by a typical example for manufacture of felt filter bags having needled side seams and conical ends, which example should not be construed as limiting in scope.

EXAMPLE

Two continuous flat layers of needled felt filter media material, each 72 inches wide, made from acrylic viscose fibers and having a denier of 3-8, are provided and superimposed to form a composite sheet. The composite layers are passed over rollers and under a needling board at a rate of 3 linear yards per minute. The needling board is patterned so as to produce a series of transverse needled paths each 1.0 inches wide and spaced six inches apart. The needling for each path takes about 15 seconds elapsed time. The patterned layered composite then passes through a cutting step in which a slit is made along a central portion of each needled path, thereby forming a plurality of tubular pieces each having length equal to the composite sheet width. These long tubular pieces are then segmented to a length of 12 inches with a conical shape at one end. The conical edges are then stitched together on a sewing machine to form the individual filter bags similar to that shown by FIG. 4D.

Other modifications and variations of the method of manufacture for multiple filter bags and the filter bag products can be made without departing from the scope of the invention, which is defined by the following claims.

We claim:
1. A method for forming multiple fibrous filter bags each having needled side seams, comprising the steps of:
    (a) superimposing two elongated layers of a fibrous filtering media, each layer having substantially identical weight and composition, so as to form a layered composite sheet;
    (b) joining the two fibrous media layers of the composite sheet together by needling a series of transverse paths so as to form a plurality of tubular channels extending transversely along the width of the layered composite sheet, forming said needled paths with a width of 0.75 to 1.5 inches and needled density of 50-200 punchings/in$^2$, and arranging the needled paths spaced apart from each other along the length of the composite sheet;
    (c) slitting each said needled transverse path along a central portion of the path and forming separate tubular portions each having two needled side seams;
    (d) segmenting the tubular portions to a desired length as so to provide multiple tubular segments each having a desired length; and
    (e) closing one end of each said tubular segment so as to form multiple filter bag structures.

2. The method according to claim 1, further comprising spacing adjacent needled paths apart from each other by 4 to 18 inches so as to form the plurality of tubular channels, and wherein after said segmenting, the desired length of the multiple tubular segments is 12-36 inches.

3. The method according to claim 2, further comprising spacing apart adjacent needled paths so as to provide adjacent tubular channels having alternating different widths.

4. The method according to claim 1, further comprising stitching closed one end of each tubular segment.

5. The method according to claim 1, further comprising needing one end of each tubular segment closed with a cross path 0.40-0.75 inches wide.

6. The method according to claim 1, further comprising needling the transverse paths in the layered substrate at the rate of 2-10 linear yards/minute.

7. The method according to claim 1, further comprising forming said transverse needled paths non-parallel to each other so that the adjacent paths form an included angle of 5-15 degree.

8. A method for forming multiple fibrous filter bags, utilizing needled side seams, comprising the steps of:
    (a) superimposing two elongated layers of a fibrous felt filtering media, each layer having substantially identical weight and composition, so as to form a layered composite sheet;

(b) joining the two fibrous felt media layers of the composite sheet together by needling a series of transverse paths so as to form a plurality of tubular channels extending transversely along the width of the layered composite sheet, needling at least one cross needled path extending along the length of the composite sheet, and needling said transverse needled paths each having width of 0.75 to 1.5 inches and needling density of 50–200 punchings/in$^2$ the needled transverse paths being spaced apart from each other along the length of the composite sheet;

(c) slitting each said needled transverse path along a central portion of the path so as to form separate tubular portions each having two needled side seams; and (d) segmenting the tubular portions by cutting adjacent said cross needled path so as to provide multiple tubular segments each having length of 12–18 inches with one end of each said tubular segment being closed by the cross needling, so as to form multiple filter bag structures.

9. Multiple fibrous filter bag products having needled path edges each with a needled density of 50–200 punches/in$^2$ and width of 0.75 to 1.5 inches, formed by utilizing the method steps of:

(a) superimposing two elongated layers of a fibrous felt filtering media, each layer having substantially identical weight and composition, so as to form a layered composite sheet;

(b) joining the two felt media layers of the composite sheet together by forming a series of tubular channels extending transversely along the width of the layered composite sheet, and being spaced apart from each other along the length of the composite sheet by needling a series of transverse paths;

(c) slitting each said needled transverse path along a central portion of the path to form separate tubular portions each having two needled side seams;

(d) segmenting the tubular portions to a desired length so as to provide multiple tubular segments; and (e) closing one end of each said tubular segment to form multiple filter bag structures.

10. Multiple filter bags formed according to claim 9, wherein the needled paths are spaced apart so as to form tubular channels each having a total width of 4 to 18 inches, and the multiple tubular portion segments are each 12–36 inches long.

11. Multiple filter bags formed according to claim 9, wherein said one end of each said tubular segment is closed by a stitched seam.

12. Multiple filter bags formed according to claim 9, wherein said one end of each said tubular segment is closed by a cross needled seam 0.40–0.75 inches wide.

13. Multiple filter bags formed according to claim 9, wherein said fibrous filtering media consists of fibers of acrylic, aramid, nylon, polyester or rayon material.

14. Multiple filter bags formed according to claim 9, wherein said fibrous filtering media includes a mixture of 1.5 and 3 denier size fibers, has a media thickness of 0.055–0.090 inch, and is capable of effectively removing particles larger than 10 microns.

15. Multiple filter bags formed according to claim 9, wherein said fibrous filtering media includes a mixture of 5.0–15.0 denier fibers, has a media thickness of 0.060–0.125 inch, and is capable of effectively removing particles of 15–50 micron size.

16. Multiple filter bags formed according to claim 9, wherein said fibrous filtering media includes a mixture of 15–35 denier fibers, has a media thickness of 0.70–0.250 inch, and is capable of effectively removing particles of 75–200 microns.

17. Multiple filter bags formed according to claim 9, wherein said needled transverse paths are non-parallel with each other so that the adjacent paths form an included angle of 5–15 degrees.

18. Multiple fibrous filter bag products formed by utilizing the method steps of:

(a) superimposing two elongated layers of a fibrous felt filtering media, each layer having substantially identical weight and composition so as to form a layered composite sheet;

(b) joining the two felt media layers of the composite sheet together by needling a series of transverse paths and forming a plurality of tubular channels extending transversely across the width of the layered composite sheet, and forming at least one cross needled path extending along the length of the composite sheet, said transverse needled paths each having a width of 0.75 to 1.5 inches and a needling density of 50–200 punchings/in$^2$, with the needled paths being spaced apart from each other along the length of the composite sheet;

(c) slitting each said transverse needled path along the path central portion so as to form separate tubular portions each having two needled side seams; and (d) segmenting the tubular portions adjacent to the cross needled path so as to provide multiple tubular segments with one end of each said tubular segment being closed by the cross needled seam so as to produce multiple filter bag structures.

19. A fibrous filter bag product formed from a multiple bag sheet comprising:

two adjacent elongated layers of a fibrous filtering media material, each said layer having substantially identical composition and weight, said layers each having two longitudinal edges which are joined together with the edges of the adjacent sheet by a needled seam 0.75–1.5 inches wide, to form a tubular member; said needled seam having needling density of 50–200 punchings/in$^2$; said tubular members being open at one end and being closed by a needled seam at the other end.

20. A fibrous filter bag according to claim 19, wherein said fibrous filtering media is felt polyester material composed of a non-woven mixture of 1.5–35 denier fibers and having media thickness of 0.055–0.250 inch.

21. A fibrous filter bag according to claim 20, wherein said fibrous filtering media felt layer is 4–18 inches wide and 12–36 inches long.

22. A fibrous filter bag according to claim 19, wherein said side needled seams are tapered at an included angle relative to each other of 5°–15°.

23. A fibrous filter bag according to claim 19, wherein said fibrous filtering media consists of fibers of acrylic, aramid, nylon, polyester or rayon material.

24. Multiple filter bags formed according to claim 19, wherein said fibrous filtering media includes a mixture of 1.5 and 3 denier size fibers, has a media thickness of 0.055–0.090 inch, and is capable of effectively removing particles larger than 10 microns.

25. Multiple filter bags formed according to claim 19, wherein said fibrous filtering media includes a mixture of 5.0–15.0 denier fibers, has a media thickness of 0.060–0.125 inch, and is capable of effectively removing particles of 15–50 micron size.

26. Multiple filter bags formed according to claim 19, wherein said fibrous filtering media includes a mixture of 15–35 denier fibers has a media thickness of 0.70–0.250 inch, and is capable of effectively removing particles of 75–200 microns.

* * * * *